United States Patent [19]

Schwank

[11] Patent Number: 5,087,467
[45] Date of Patent: Feb. 11, 1992

[54] METHOD OF INHIBITING DISCOLORATION OF PRODUCE

[75] Inventor: Dennis J. Schwank, Stockton, Calif.

[73] Assignee: Karl R. Mygrant, Byron, Calif.

[21] Appl. No.: 502,428

[22] Filed: Mar. 30, 1990

[51] Int. Cl.$^5$ ................................................ A23B 7/10
[52] U.S. Cl. .................................. 426/262; 426/310; 426/321; 426/531
[58] Field of Search ............... 426/615, 270, 262, 321, 426/335, 323, 310, 331, 532, 418, 419, 268, 316, 326, 541

[56] References Cited

U.S. PATENT DOCUMENTS

| | | | |
|---|---|---|---|
| 3,305,366 | 2/1967 | Sutton | 426/615 |
| 4,011,348 | 3/1977 | Farrier | 426/270 |
| 4,097,612 | 6/1978 | Powrie et al. | |
| 4,221,819 | 9/1980 | Falci et al. | |
| 4,814,192 | 3/1989 | Sapers | 426/321 |
| 4,882,190 | 11/1989 | Olson | 426/270 |
| 4,937,085 | 6/1990 | Cherry | 426/310 |
| 4,988,522 | 1/1991 | Warren | 426/270 |
| 4,988,523 | 1/1991 | Gardner | 426/270 |

OTHER PUBLICATIONS

Sporix Product Bulletin.
Segal 1976 Biochemical Calculations pp. 403–406, John Wiley and Sons, New York.
Reed 1966 Enzymes in Food Processing, pp. 186–192, Academic Press, New York.

*Primary Examiner*—Carolyn Paden
*Attorney, Agent, or Firm*—Bielen, Peterson & Lampe

[57] ABSTRACT

A method of inhibiting discoloration of produce, such as peeled raw potatoes, apples and the like, utilizing the steps of immersing the produce in an aqueous solution containing an anion such as phosphate, pyrophosphate, sulfate or chloride. The aqueous solution is maintained at a pH of less than 2 and the produce is immersed in the aqueous solution for a sufficient time to arrest the phenolase coloration. Produce is then removed from the aqueous solution and rinsed to remove the aqueous solution from the surface of the produce.

10 Claims, 2 Drawing Sheets

METHOD OF INHIBITING DISCOLORATION OF PRODUCE

BACKGROUND OF THE INVENTION

The present invention relates to a novel process for inhibiting the browning of produce.

Sulfite containing compounds have been used as anti-browning agents, ie; to keep raw or peeled vegetables and fruits from discoloring. Unfortunately, the use of sulfites in conjunction with fresh produce causes certain medical problems with the ultimate consumer of the produce. For example, asthmatics are deemed to be accutely susceptible to sulfites. Certain governmental authorities now require the marking of packaged goods containing more than 10 parts per million of sulphur dioxide equivalent.

In addition, sulfites have been banned by certain governmental authorities for use on fresh vegetables and fruits, including peeled potatoes.

Browning of peeled produce is undesirable, being unaesthetic and perceived to indicate spoiling in the produce. One of the chemical reactions which causes the browning of cut or damaged vegetable surfaces is normally referred to as phenolase (enzymatic) browning. It is believed that damaged or cut vegetable tissue, when exposed to air enhances the enzymatic oxidation of natural phenolase substrates to orthoquinones. Subsequently, the orthoquinones rapidly polymerize to form brown pigments or melanins. Such oxidation is catalyzed by enzymes known as phenolase or polyphenol oxide, tyrosinase, and catecholase. More over, enzymatic browning of this type requires four essential components; oxygen, a particular enzyme, copper, and a substrate. To control browning, one of the essential components must be eliminated. Removing oxygen from the exposed surfaces of vegetables is difficult and expensive to attain in large scale food processing facilities. Phenolase enzymes are naturally present in the fruits and vegetables being treated for browning and are not easily removed therefrom. For example, steam blanching of produce to remove phenolase enzymes causes undesirable softening of the products.

The employment of prior art chelating agents to remove copper from produce has only slowed the browning reaction, not completely eliminating the same. It should be noted that citric acid has been tried as a chelating agent, but such attempts have been unsuccessful in preventing phenolase browning.

It is also important that an treatment to prevent browning in cut fresh raw fruits and vegetables be compatible with governmental findings as to the biological safety of chemical compounds. U.S. Pat. No. 4,097,612 describes the use a three step immersion process in solutions of citrate, and sulfur dioxide, a second solution of alkali metal pyrophosphate, and a third aqueous solution of an alkaline earth metal salt. U.S. Pat. No. 4,221,819 describes an process for treating shrimp which employes an aqueous solution containing a phosphate salt in the presence of traces metals, such as calcium and magnesium, to preserve the texture of the shrimp when it is later cooked and consumed.

A process which inhibits phenolase browning of cut produce in substitution for sulfite containing compounds would be a notable advance in the food processing industry.

SUMMARY OF THE INVENTION

In accordance with the present invention a novel and useful process for the inhibition of browning in cut raw vegetables is herein provided.

The method of the present invention utilizes an aqueous solution having a pH of less than 2.0, containing anions capable of maintaining a negative charge at this pH level. For example, anions such as phosphate, pyrophosphate sulfate, and chloride appear to adequately prevent phenolase browning in cut raw produce such as potatoes, apples, pears, and the like. Increasing the pH of such aqueous solution above 2.0 noticeably decreases the inhibition of phenolase browning in raw produce. These anions successfully interfere with the browning process at this pH level, which will be further discussed as the specification continues.

Anions may be donated to the aqueous solution from acids such as phosphoric acid, sulfuric acid, and hydrochloric acid. In addition, a multiplicity of salts having the desirable anions maybe dissolved in an aqueous bath. The pH of such a bath may then be lowered by the addition of a strong acid. For example, phosphate or phosphate-like ions may be provided by salts such as sodium biphosphate, sodium tripolyphosphate, tetrasodium pyrophosphate, sodium orthophosphate, disodium phosphate trisodium phosphate, and the like. A strong acid would then be added to such salt solution to adjust pH below the level of 2.0. Strong acids such as hydrochloric, phosphoric, and sulfuric having been found to suffice in this regard.

Further, the needed concentration of a particular ion in the aqueous bath varies according to its identity. Phosphate ions are generally concentrated to at least 0.5 moles per liter for employment in the present process. Further, sulfate and chloride ions must be more highly concentrated to produce adequate results in the process of the present invention. The former has been found to adequately inhibit phenolase browning at about 1.0 moles per liter, while the later requires at least 2.0 moles per liter as a concentration level.

Immersion of cut produce in the aqueous baths above described generally takes place for a relatively short time duration, ie. one to five minutes. In general, longer immersion times of the cut produce in the aqueous bath, permit higher pH and lower ion concentration levels of the anions. The temperature of the immersion bath generally ranges between 4° and 70° C. At this temperature, range it has been found that temperature variation does not appreciably affect the browning inhibition process. However, treatment at higher temperatures may permit less extreme treatment bath conditions i.e. greater than pH 2.0 and lesser ion concentrations.

The treated produce is normally rinsed in soft water for a short period of time, one minute or less, and then stored in sealed plastic bags. The produce may then be used for further processing, in the case of the potatoes, for making french fries, or hash browns and the like. Of course, further cuttling of the produce at this stage will require the above process to inhibit discoloration of the newly cut surfaces.

It is believed that the mechanism responsible for the inhibition of phenolase browning described in the present invention is the result of tying up of the copper ions in the raw produce as well as protein denaturing. In other words, in is theorized that copper forms complexes with the anions, such as phosphate, pyrophosphate sulfate, and chloride. Complexing of the copper ions at low pH entails the use of anions which retain a negative charge in this environment. Phosphate, pyrophosphate sulfate, and chloride, described in the following examples produce adequate results. Protein denaturing also take place in this acidic environment. This combination of events is theorized as inhibiting the phenolase browning system naturally existing in raw produce. It has been observed that immersion in the prepared bath not only serves to preverse color but also acts as a decolorizing agent, to a certain extent.

For a better understanding of the invention references made to the following Examples.

There will now be given some examples illustrating the preferred embodiments of the invention. The examples which follow are merely for illustrative proposes and are not considered to be as limitations on the scope of the invention found in the claims herein after.

EXAMPLE 1

A 7 mm I.D. stainless steel cork borer was employed to obtain plugs of potatoes from raw potatoes. The potato plugs were sliced into 0.4 cm cylinder-shaped samples. A bath of phosphoric acid was prepared with a pH range of 1.0–2.5 at temperatures of 50° C.–70° C. The potato cylinders were immersed in the bath for 1–5 minutes. Each sample of each run was rinsed and stored in a plastic bag for (5) days. The following results were obtained:

| RUN # | pH | TEMP (°C.) | TIME (min) | COLOR |
| --- | --- | --- | --- | --- |
| 1 | 1 | 50 | 1 | 2 |
| 1 | 1 | 50 | 1 | 3 |
| 2 | 2.5 | 50 | 1 | 19 |
| 2 | 2.5 | 50 | 1 | 19 |
| 3 | 1 | 70 | 1 | 3 |
| 3 | 1 | 70 | 1 | 3 |
| 4 | 2.5 | 70 | 1 | 23 |
| 4 | 2.5 | 70 | 1 | 23 |
| 5 | 1 | 50 | 5 | 3 |
| 5 | 1 | 50 | 5 | 2 |
| 6 | 2.5 | 50 | 5 | 3 |
| 6 | 2.5 | 50 | 5 | 3 |
| 7 | 1 | 70 | 5 | 1 |
| 7 | 1 | 70 | 5 | 2 |
| 8 | 2.5 | 70 | 5 | 1 |
| 8 | 2.5 | 70 | 5 | 1 |
| 9 | 1.75 | 60 | 3 | 1 |
| 9 | 1.75 | 60 | 3 | 1 |
| 9 | 1.75 | 60 | 3 | 1 |
| 9 | 1.75 | 60 | 3 | 1 |

The color of each sample was judged by comparison to paint color chips marketed by Standard Brands Company. The following is a listing of the color reference scale.

| COLOR # | S.B. PAINT CHIP # | GENERAL COLOR DESCRIPTION |
| --- | --- | --- |
| 1 | 0-8-36p | WHITE |
| 5 | Q6-6p | LIGHT YELLOW |
| 10 | Q5-46p | CREAM |
| 15 | Q6-26p | LIGHT TAN |
| 20 | Q6-53T | LIGHT BROWN |
| 25 | Q4-64U | DARK BROWN |

This color description is used throughout the Examples, herein. Generally the color "8" and below is acceptable.

Figure 1:
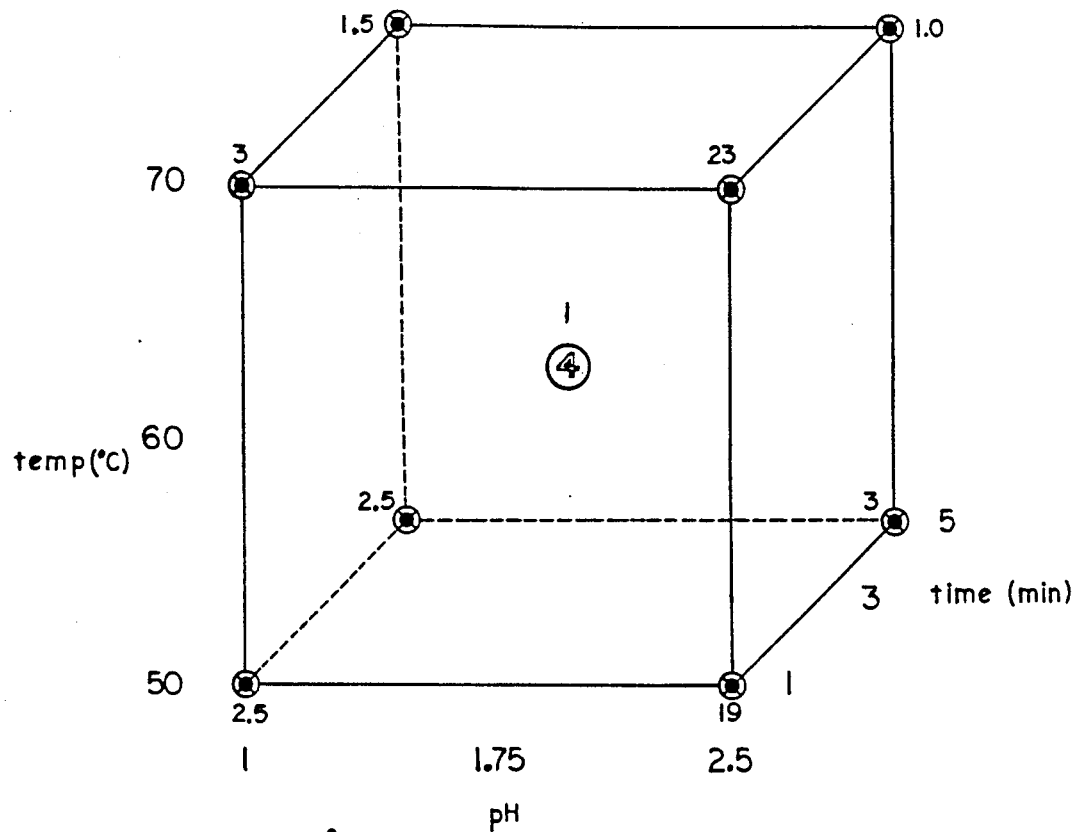
FIG. 1 is a schematic view in Factorial format representing the information found in Example 1, hereinafter.

FIG. (1) represents the data from Example 1 in the Factorial. The circled "4" designation appearing in the center of FIG. 1, indicates that the experimental result was replicated four times.

The texture of all the samples appeared to be in good condition.

EXAMPLE 2

The same potato cylinder-shaped samples were prepared and immersed in the bath, as in Example 1. The potato cylinders were immersed from 1–3 minutes, at a pH range of 1.25–1.75 and at temperatures between 4°–44° C. The sample of each run was rinsed and stored in a plastic bag for (5) days. The following results were obtained in tabular form:

TABLE I

| RUN # | pH | TEMP (°C.) | TIME (min) | COLOR |
| --- | --- | --- | --- | --- |
| 1 | 1.75 | 44 | 2 | 10 |
| 2 | 1.75 | 4 | 2 | 7 |
| 3 | 1.25 | 44 | 2 | 1 |
| 4 | 1.25 | 4 | 2 | 2 |
| 5 | 1.75 | 24 | 3 | 19 |
| 6 | 1.75 | 24 | 1 | 10 |
| 7 | 1.25 | 24 | 3 | 3 |
| 8 | 1.25 | 24 | 1 | 6 |
| 9 | 1.5 | 44 | 3 | 3 |
| 10 | 1.5 | 44 | 1 | 1 |
| 11 | 1.5 | 4 | 3 | 20 |
| 12 | 1.5 | 4 | 1 | 6 |
| 13 | 1.5 | 24 | 2 | 5 |
| 13 | 1.5 | 24 | 2 | 20 |
| 13 | 1.5 | 24 | 2 | 8 |

After (8) days the following results were obtained:

| RUN # | pH | TEMP (°C.) | TIME (min) | COLOR |
| --- | --- | --- | --- | --- |
| 1 | 1.75 | 44 | 2 | 15 |
| 2 | 1.75 | 4 | 2 | 19 |
| 3 | 1.25 | 44 | 2 | 1 |
| 4 | 1.25 | 4 | 2 | 5 |
| 5 | 1.75 | 24 | 3 | 23 |
| 6 | 1.75 | 24 | 1 | 20 |
| 7 | 1.25 | 24 | 3 | 9 |
| 8 | 1.25 | 24 | 1 | 16 |
| 9 | 1.5 | 44 | 3 | 8 |
| 10 | 1.5 | 44 | 1 | 5 |
| 11 | 1.5 | 4 | 3 | 23 |
| 12 | 1.5 | 4 | 1 | 15 |
| 13 | 1.5 | 4 | 2 | 15 |
| 13 | 1.5 | 24 | 2 | 21 |
| 13 | 1.5 | 24 | 2 | 15 |

TABLE II

| RUN # | pH | TEMP (°C.) | TIME (min) |
|---|---|---|---|
| 1 | 1.75 | 24 | 3 |
| 2 | 2 | 4 | 3 |
| 3 | 1.75 | 44 | 5 |
| 4 | 2 | 24 | 5 |
| 5 | 1.75 | 4 | 5 |
| 6 | 1.5 | 44 | 3 |
| 7 | 1.5 | 24 | 5 |
| 8 | 1.75 | 24 | 3 |
| 9 | 1.75 | 44 | 1 |
| 10 | 1.5 | 4 | 3 |
| 11 | 1.5 | 24 | 1 |
| 12 | 2 | 44 | 3 |
| 13 | 1.75 | 4 | 1 |
| 14 | 2 | 24 | 1 |
| 15 | 1.75 | 24 | 3 |

Table II represents a similar set test to those found in Table I. In the Table II tests the following parameters were maintained: pH at 1.5-2.0, bath time of 1-5 minutes, and temperatures of 4°-44° C., for potato samples identical to those employed to generate the data of Table I.

Figure 2:
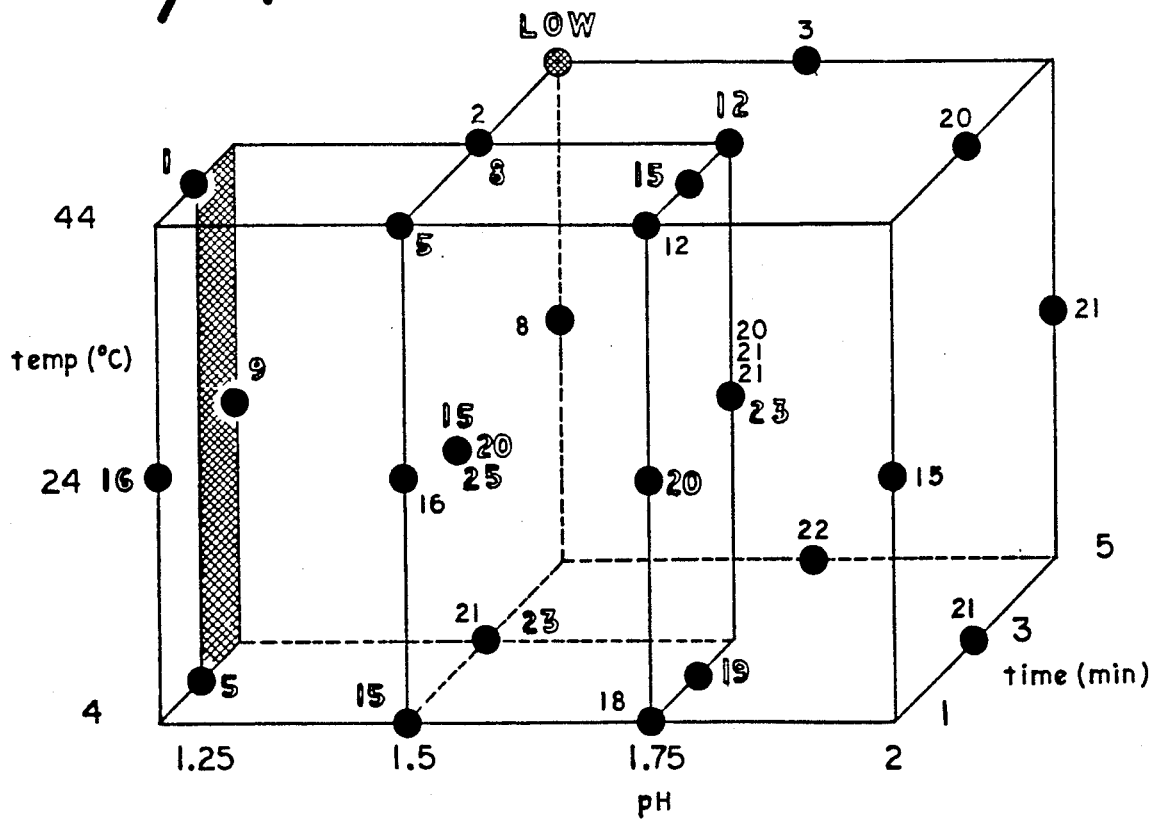
FIG. 2 is a schematic view in composite Box-Behnken format representing the information found in Example 2, hereinafter.

FIG. 2 represents the composite (ovelain) Box-Behnken format of the above data found in Tables I and II of the potato cylinders after (8) days. The left-hand box of FIG. 2 represents the data found in Table I and the right-hand box represents the data found in Table II.

EXAMPLE 3

To test for flavor retention, odor, and toxicity, a bath was prepared utilizing 170 ml. of concentrated phosphoric acid, (88%), and (4) liters of distilled water in a plastic bucket. The bath employed in the following test was maintained at room temperature, about 24° C. Twenty four raw half potato samples were prepared by abrasive peeling and cutting; (6) half potatoes were used per batch. In each batch three different treatment procedures were used employing (2) half potatoes:

a. a (2) minute bath dip followed by a (1) minute rinse in distilled water,
b. a minute bath dip followed by no rinse, and,
c. a (10) second bath dip followed by no rinse.

The pH of each batch was determined to be between 1.25 and 1.31. After immersion in the bath, each of the twenty-four samples were placed in large plastic bags, sealed air tight, and stored at 4° C. Over a subsequent twelve day period, all the potato samples were cooked in a microwave oven with a raw fresh unpeeled control potato. The potatoes were consumed. No significant off-taste or off-odor was noted from any of the samples. The color for all the samples which underwent the three treatment procedures remained acceptable. The texture of all the samples remained acceptable.

EXAMPLE 4

A three component mixture was tested for phenolase browning inhibition on produce. Potato cylinder-shaped samples were prepared according to the procedure delineated in Example 1. Various mixtures of acids were used starting with the following concentrated bath components on a volumetric basis:

| | |
|---|---|
| $H_2SO_4$ | 93% |
| HCl | 36.5-38% |
| $H_3PO_4$ | 88% |

Potato samples were immersed in baths of the concentrated bath components at a pH of 1.25, temperature of 24° C., and for a time period of 2 minutes. The samples were rinsed and sealed in bags. After seven days the following results were obtained:

| RUN # | $H_3PO_4$ | HCL | $H_2SO_4$ | Y = COLOR |
|---|---|---|---|---|
| 1 | ALL | 0 | 0 | 2 |
| 1 | ALL | 0 | 0 | 2 |
| 2 | 0 | ALL | 0 | 21 |
| 2 | 0 | ALL | 0 | 25 |
| 3 | 0 | 0 | ALL | 9 |
| 3 | 0 | 0 | ALL | 9 |
| 4 | ½ | ½ | 0 | 10 |
| 4 | ½ | ½ | 0 | 16 |
| 5 | ½ | 0 | ½ | 5 |
| 5 | ½ | 0 | ½ | 14 |
| 6 | 0 | ½ | ½ | 9 |
| 6 | 0 | ½ | ½ | 10 |
| 7 | ⅓ | ⅓ | ⅓ | 11 |
| 7 | ⅓ | ⅓ | ⅓ | 16 |
| 8 | ⅔ | 1/6 | 1/6 | 3 |
| 8 | ⅔ | 1/6 | 1/6 | 9 |
| 9 | 1/6 | ⅔ | 1/6 | 22 |
| 9 | 1/6 | ⅔ | 1/6 | 10 |
| 10 | 1/6 | 1/6 | ⅔ | 10 |
| 10 | 1/6 | 1/6 | ⅔ | 3 |

Figure 3:
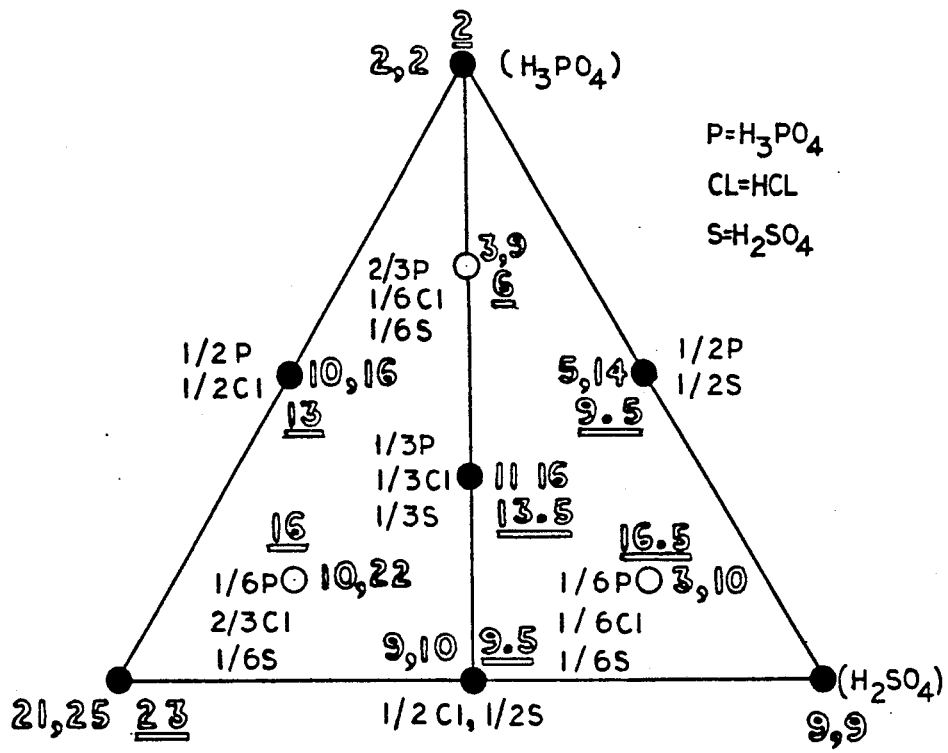
FIG. 3 is a schematic view of a graph representing the information found in Example 4, hereinafter.

FIG. 3 graphically represents the data from Example 4.

EXAMPLE 5

Potato samples were abrasively peeled and sliced into french fries and whole peels. A bath utilizing only phosphoric acid (88%) was prepared at about pH 1.25 and a temperature of 27° C. The following three treatments were employed, each using a fresh portion of the bath:

(1) (2) minute bath treatment only;
(2) (2) minute bath treatment followed by a (30) second rinse in soft water; and
(3) (15) second "dip" operation bath only.

The samples were then sealed in plastic bags. After two days, the color of all the samples was good (less than 8), however only the texture of the french fries and whole peels processed under treatment number (2) possessed good texture. The texture of the french fries and whole peels processed under treatment numbers 1 and 3 appeared rubbery.

EXAMPLE 6

Potato samples were prepared according to the potato technique described in Example 1 utilizing raw peeled potatoes. Three immersion baths were prepared by dissolving sodium sulfate in water to concentration of 1.25 m, 1.50 m, and 1.75 m of sulfate, where m equals moles/liter. Each bath was then brought to pH 1.25 by the addition of concentrated sulfuric acid. The potato samples were immersed for two minutes in each bath at room temperature (24° C.), rinsed for one minute in distilled water, and sealed in a plastic bag. All samples had a color number of "1" after (5) days.

EXAMPLE 7

Apple and pear samples were prepared according to the potato technique described in Example 1. A bath of water and phosphoric acid with a phosphate species concentration of 0.5 m was prepared using concentrated phosphoric acid (88%). The bath was brought to a pH of 1.25. The samples were immersed for two minutes and then rinsed with distilled water for one minute. The treated samples were bagged and stored at 4° C. After one day the treated samples appeared to retain a white color, (1-2) for pears and (5) for apples on the color reference scale.

EXAMPLE 8

Cut potatoes prepared according to Example 1 were treated with three baths prepared with sodium chloride and water to concentrations of 1 m, 2 m and 3 m, where m = moles/liter. Concentrated hydrochloric acid was added to adjust the pH of each bath to a level of 1.25. The samples were then immersed for two minutes at 24° C., rinsed in distilled water for one minute, and stored in plastic bags at 4° C. After one day the samples appeared white, (1) on the color reference scale.

EXAMPLE 9

Figure 4:
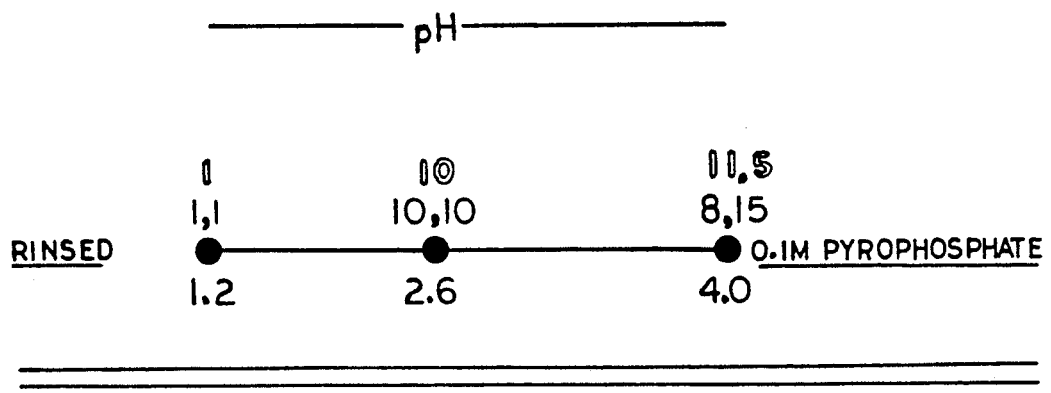
FIG. 4 is a schematic view of a graph representing the information found in Example 9, hereinafter.
Figure 4:
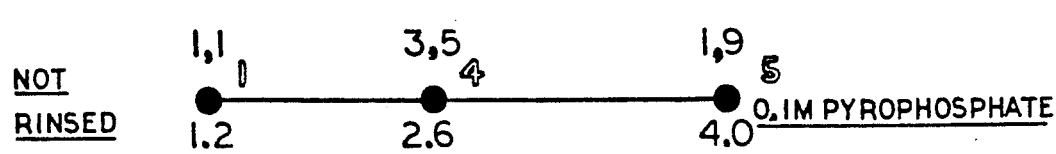

Potato samples were prepare according to the process of Example 1. Two replicates of six baths were prepared utilizing sodium pyrophosphate as a source of complexing ions and hydrochloric acid as the pH adjusting agent. Pyrophosphate concentration was 0.1 m (moles per liter). The pH ranged from 1.2 to 4.0. One set of six experiments included a rinse step after treatment; the other set of six was not rinsed. The samples were bagged and stored at 4° C. After 2 days, the color of the samples was graded (see FIG. 4). Of the rinsed samples, only those treated at pH 1.2 were still acceptable; treatment at higher pH's were unacceptable. The block numbers on FIG. 4 represent average color scale values.

WHAT IS CLAIMED IS:

1. A method for inhibiting the discoloration of produce, comprising the steps of:
   a. immersing the produce in an aqueous solution having a pH of less than 2.0, said aqueous solution containing anions capable of maintaining a negative charge at said pH of less than 2.0, said immersion being for a sufficient time to arrest the phenolase coloration;
   b. removing the produce from said aqueous solution; and,
   c. rinsing said aqueous solution from the produce.

2. The method of claim 1 in which said anions are selected from the group consisting of phosphate, pyrophosphate, sulfate and chloride.

3. The method of claim 2 in which said phosphate ions are provided by phosphoric acid.

4. The method of claim 2 in which said phosphate ions are provided by salts selected from the group consisting of sodium biphosphate, sodium tripolyphosphate, tetrasodium pyrophosphate, sodium orthophosphate, disodium phosphate, and trisodium phosphate.

5. The method of claim 2 in which said, phosphate ions are concentrated in said aqueous solution to at least at 0.5 moles per liter.

6. The method of claim 2 in which said sulfate ions are concentrated in said aqueous solution to at least at 1.0 mole per liter.

7. The method of claim 2 in which said chloride ions are concentrated in said aqueous solution at least to at 2.0 moles per liter.

8. The method of claim 1 in which said step of immersing the produce for a sufficient time ranges between one and five minutes.

9. The method of claim 1 in which said immersing sjtep further includes the step of preparing said aqueous solution using a source of anions selected form the group consisting of phosphate, pyrophosphate sulfate, and chloride, and further includes the step of adjusting the pH of said aqueous solution by the addition of a strong acid.

10. The method of claim 4 in which said strong acid is selected from the group consisting of hydrochloric, phosphoric and sulfuric acid.

* * * * *